(12) United States Patent
Nies et al.

(10) Patent No.: US 8,468,787 B2
(45) Date of Patent: Jun. 25, 2013

(54) STACKABLE SPRINKLER

(75) Inventors: Juergen Nies, Winchester, VA (US); Vicky Ann Michael, Winchester, VA (US); Ha Van Duong, Winchester, VA (US); Richard King Boyle, Winchester, VA (US)

(73) Assignee: Melnor, Inc., Winchester, VA (US)

( * ) Notice: Subject to any disclaimer, the term of this patent is extended or adjusted under 35 U.S.C. 154(b) by 598 days.

(21) Appl. No.: 12/711,840

(22) Filed: Feb. 24, 2010

(65) Prior Publication Data
US 2010/0314471 A1 Dec. 16, 2010

Related U.S. Application Data

(60) Provisional application No. 61/186,588, filed on Jun. 12, 2009.

(51) Int. Cl.
*B65B 35/50* (2006.01)
*B65B 35/30* (2006.01)
*A62C 2/08* (2006.01)
*B05B 1/20* (2006.01)

(52) U.S. Cl.
USPC ........... 53/540; 53/443; 53/447; 53/531; 53/541; 239/548; 239/566

(58) Field of Classification Search
USPC ......... 239/289, 548, 553.3, 566, 600; 53/443, 53/447, 531, 540, 541
See application file for complete search history.

(56) References Cited

U.S. PATENT DOCUMENTS

| | | | |
|---|---|---|---|
| D165,756 S | * | 1/1952 | Ingham et al. ............... D23/221 |
| D178,782 S | | 9/1956 | Jepson et al. |
| D218,970 S | | 10/1970 | Mango et al. |
| D218,971 S | | 10/1970 | Mango et al. |
| D351,214 S | | 10/1994 | Clivio |
| D366,308 S | | 1/1996 | Goodman et al. |
| D371,596 S | | 7/1996 | Simonetti |
| D383,193 S | | 9/1997 | Heren et al. |
| D387,127 S | | 12/1997 | Guo |
| D422,052 S | | 3/2000 | Heren |
| D422,681 S | | 4/2000 | Heren |
| D427,281 S | | 6/2000 | Guo |
| D440,629 S | | 4/2001 | Guo |
| D447,537 S | | 9/2001 | Chao |
| D447,538 S | | 9/2001 | Chao |
| D458,983 S | | 6/2002 | Chen |
| D459,436 S | | 6/2002 | Chao |
| D469,849 S | * | 2/2003 | Nien ............................ D23/216 |
| D470,218 S | | 2/2003 | Alkalay et al. |
| 6,520,430 B2 | * | 2/2003 | Chao ............................. 239/548 |
| D479,574 S | | 9/2003 | Nien |
| D500,122 S | * | 12/2004 | Schapper .................... D23/221 |
| D540,429 S | | 4/2007 | Barmore |
| D541,376 S | | 4/2007 | Barmore |
| D554,736 S | | 11/2007 | Cheng |
| D554,737 S | | 11/2007 | Lo |

(Continued)

*Primary Examiner* — Ryan Reis

(74) *Attorney, Agent, or Firm* — Westerman, Hattori, Daniels & Adrian, LLP

(57) ABSTRACT

A sprinkler is designed to be stacked upon a like sprinkler. The sprinkler includes a spray tube, a sled, a projection extending from either a top or bottom surface of the sled, and a recess formed at the top or bottom surface of the sled. The recess accommodates the projection extending from the sled of the like sprinkler so that the sprinkler can be stacked with the like sprinkler.

14 Claims, 24 Drawing Sheets

U.S. PATENT DOCUMENTS

| | | |
|---|---|---|
| D554,739 S | 11/2007 | Lo |
| D554,740 S | 11/2007 | Lo |
| D555,220 S | 11/2007 | Flaherty |
| D555,228 S | 11/2007 | Cheng |
| D557,740 S | 12/2007 | Bharma |
| D559,352 S | 1/2008 | Lo |
| D584,579 S | 1/2009 | Vendl |
| 7,484,698 B2 | 2/2009 | Budagher |
| 7,490,808 B2 | 2/2009 | Lemirande |
| 7,491,155 B2 | 2/2009 | Fenelon et al. |
| D587,492 S | 3/2009 | Gusdorf |
| D587,518 S | 3/2009 | Courington et al. |
| D588,414 S | 3/2009 | Verghese |
| D589,275 S | 3/2009 | Kubryk |
| D589,652 S | 3/2009 | Nip |
| 7,497,332 B1 | 3/2009 | Schwimmer |
| 7,497,726 B2 | 3/2009 | Wang et al. |
| 7,503,462 B2 | 3/2009 | Vroon |
| 7,506,757 B1 | 3/2009 | Ater et al. |
| 7,510,089 B2 | 3/2009 | Killinger et al. |
| 7,513,365 B2 | 4/2009 | Cornelius et al. |
| D592,874 S | 5/2009 | Solomon |
| 7,529,096 B2 | 5/2009 | Lin et al. |
| 7,536,840 B2 | 5/2009 | Ours et al. |
| 7,537,119 B2 | 5/2009 | Becklin |
| D597,628 S | 8/2009 | Goetz |
| 7,607,590 B2 | 10/2009 | Nies |
| 2008/0054103 A1 | 3/2008 | Nies |

* cited by examiner

US 8,468,787 B2

STACKABLE SPRINKLER

BACKGROUND OF INVENTION

The present invention relates to a novel structure of a sprinkler, namely an oscillating lawn sprinkler, which is designed to be easily stackable with like sprinklers.

The following description sets forth the inventors' knowledge of related art and problems therein and should not be construed as an admission of knowledge in the prior art.

Applicants incorporate by reference, U.S. Pat. No. 7,607,590.

Lawn sprinklers have been known and used for many decades. A typical lawn sprinkler is attached to a water hose and placed in an area to be watered. To operate the sprinkler, a user simply turns on the water from the water source (e.g., faucet) and the sprinkler waters the yard.

Over the years, improvements have been made to the operating design of sprinklers. For example, Melnor Model No. 4000™ sprinkler includes a novel adjustment tab that adjusts the spray width of the sprinkler However, little attention has been paid to improving the fit or form factor of the sprinkler itself.

That is, a sprinkler generally includes a base (or sled) and a spray tube. These components typically produce an irregular shape, so manufacturers put each sprinkler in a generally rectangular (often cardboard) box and then stack one box one on top of another during shipping, storing, and displaying stages. However, the box in which each sprinkler is individually packaged takes up a large amount of shipping space and shelf space. This is because the box, by necessity, is larger than the sprinkler itself. Because of this, less sprinklers fit in each shipment container and less sprinklers fit on the shelf, whether inventory or retail.

Moreover, retail stores often have outdoor lawn & garden centers wherein they display products, such as sprinklers. However, it is not desirable for such retailers to sell or even leave a boxed sprinkler outside unattended because the box (e.g., cardboard packaging) may be damaged due to moisture from rain or plant watering.

In an attempt to overcome this problem, it has been suggested to make the packaging material (cardboard box) out of a weather resistant material. However, doing so leads to increased packaging costs and does not present any advantage with respect to saving materials or space.

SUMMARY

It is an object of the present invention to reduce costs associated with manufacturing, shipping and selling a sprinkler.

The present invention provides a package-free sprinkler that is stackable with another like sprinkler No cardboard boxes are needed for each individual sprinkler This saves manufacturing, shipping and sales costs of the product. The stackable solution is applicable to any type of lawn sprinkler, but particularly rectangular sprinklers and more particularly, rectangular oscillating sprinklers.

The stackable sprinkler can be sold outside in lawn and garden centers because there is no cardboard box containing the sprinkler.

Further, the stackable sprinkler has a much smaller fit and form factor than a conventional sprinkler The inventors have determined that when the sprinklers are stacked they can save, according to one embodiment, approximately 27% by volume when compared to the same sprinkler found in a box. This allows retailers to display more products and stock their shelves less often. This leads to a reduced cost in selling the sprinklers.

Additionally, no paper is used in the selling of the sprinkler This also saves on packaging costs and is more environmentally friendly.

One embodiment of the invention is a stackable sprinkler comprising a sled and a spray tube, wherein said sled includes mortises or tenons (e.g., slots or projections) on its top surface, at a front and back end of the sled, wherein said sled includes mortises or tenons on its bottom surface, at a front and back end of the sled, wherein said tenons are designed to fit inside said mortises so that said sprinkler can be stacked with another said sprinkler.

DETAILED DESCRIPTION OF THE DRAWINGS

Several embodiments of the invention are described in detail below with reference to the accompanying drawings.

The embodiments as shown in the figures and discussed below are exemplary of the invention and do not limit the scope of the invention to that explicitly shown or described. Further, in each of the embodiments set forth below, the material used may typically be made of plastic or metal, however, any other suitable material would also work.

Figure 1:
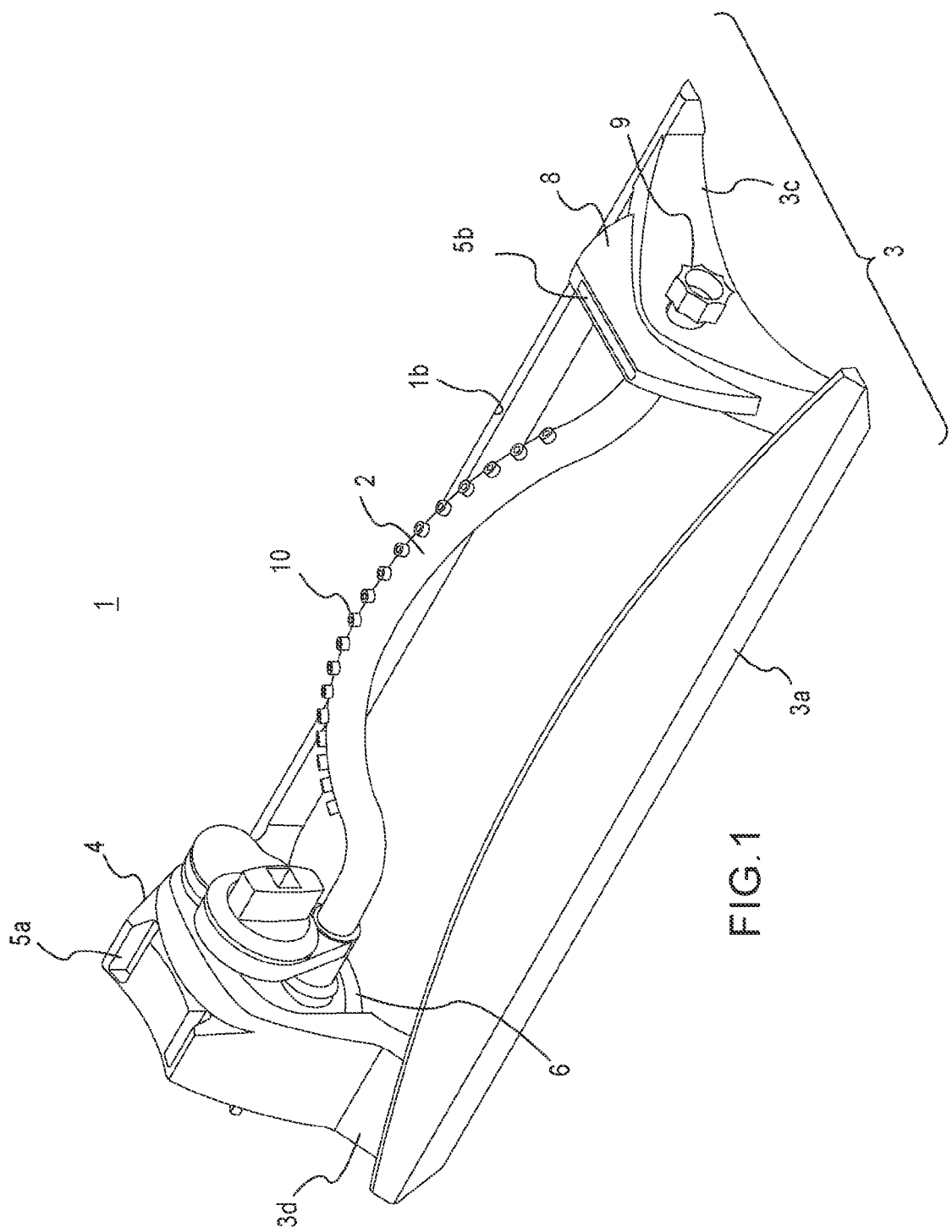
FIG. 1 is a top perspective view of a first embodiment of a stackable sprinkler.

FIG. 1 is a top perspective view of a first embodiment of stackable sprinkler 1 having sled 3 and spray tube 2. For example, the sprinkler shown in FIG. 1 could be a Melnor®, Model No. 280/300™ oscillating sprinkler The sled 3 includes sled legs 3a and 3b, front sled connecting part 3c and rear sled connecting part 3d. The sled 3 allows the sprinkler to rest securely on the ground, providing a stable platform for the sprinkler to work.

Attached to the sled 3 is spray tube 2. Spray tube 2 contains nozzles 10, from which water exits, spraying the desired area. A plug 9 seals the spray tube 2. The spray tube 2 is rotated back and forth by motor 6. Motor 6 is a water driven motor which receives its power through water pressure provided by a hose or the like (not shown).

Attached to the sled 3 is a rear mortise receiving portion 4 and a front mortise receiving portion 8, located at opposite ends of the sled 3. Rear mortise receiving portion 4 contains a plurality of rectangular-shaped (e.g., may be any shape) rear mortises 5a (e.g., slots holes, channels, grooves, etc.). Front mortise receiving portion 8 contains a front mortise 5b.

Rear mortises 5a are aligned in the direction of sled 3 (e.g., longitudinal direction or main axis of the sled 3), while front mortise 5b is aligned perpendicular to the direction of sled 3.

Figure 2:
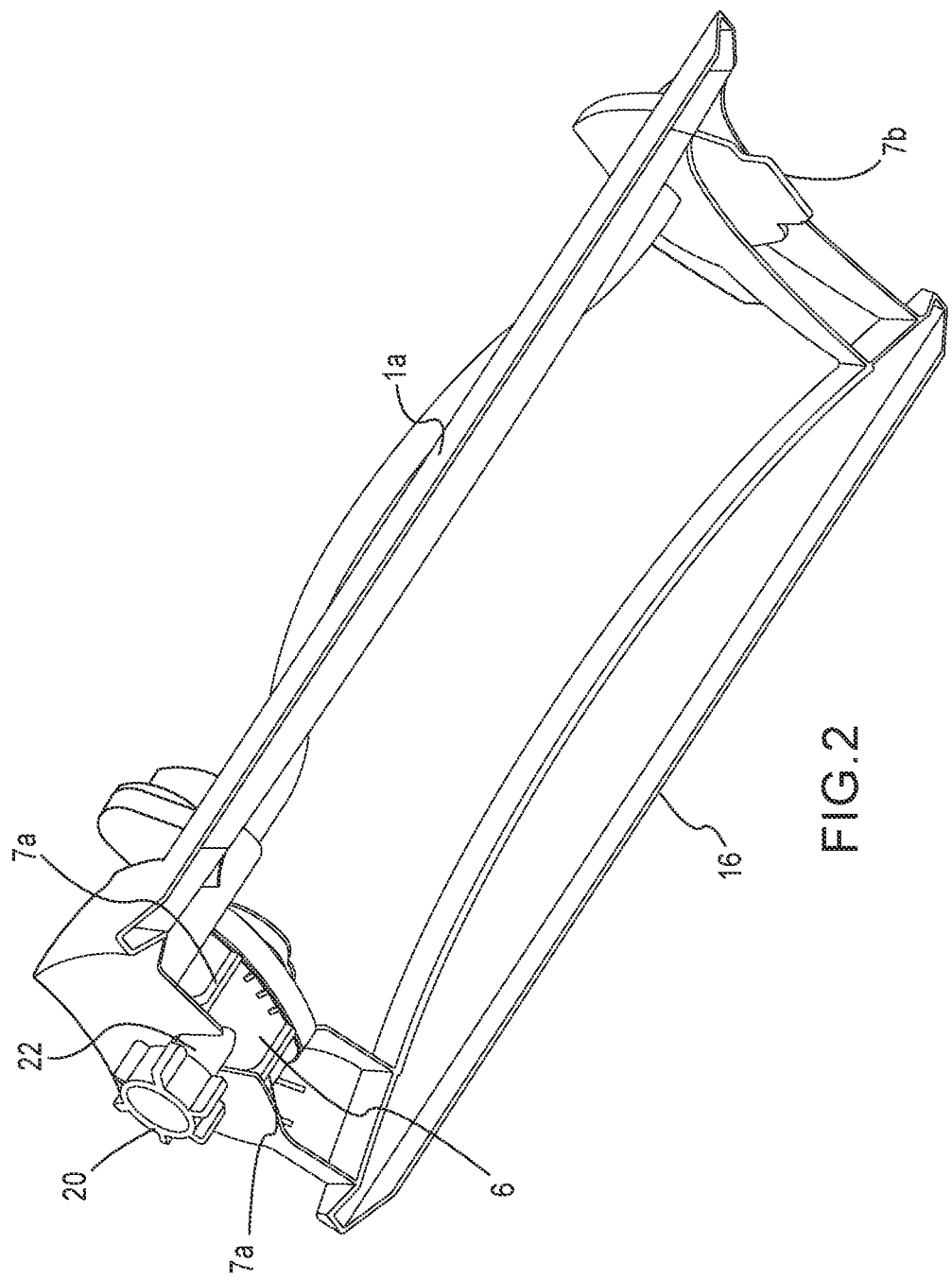
FIG. 2 is bottom perspective view of the first embodiment of the stackable sprinkler.

FIG. 2 shows a bottom perspective view of the first embodiment. Water intake 22 passes water through hose nut 22 into the motor 6. Tenons (e.g., projections, pegs, protrusions, etc.) 7a and 7b are located on the bottom of sled 3 or may also be located on the bottom of motor 6. Rear tenons 7a are aligned in the direction of sled 3 while front tenon 7b is aligned perpendicular to sled 3. Rear tenons 7a are designed to fit inside rear mortises 5a and front tenon 7b is designed to fit inside front mortise 5b.

When a first stackable sprinkler is stacked on top of a second stackable sprinkler, the tenons 7a and 7b of the second stackable sprinkler fit inside the respective mortises 5a and 5b of the first stackable sprinkler forming mortise and tenon joints which are releasably connected. Further, having one set of mortise and tenon joints aligned with the sled 3 and another set of mortise and tenon joints aligned perpendicular to sled 3, allows the top stackable sprinkler to be securely fastened to the bottom stackable sprinkler That is, the top stackable sprinkler is prevented from moving in a forward or backwards direction by the front mortise and tenon joint and is prevented from moving in a sideways direction by the rear mortise and tenon joints.

Figure 3:
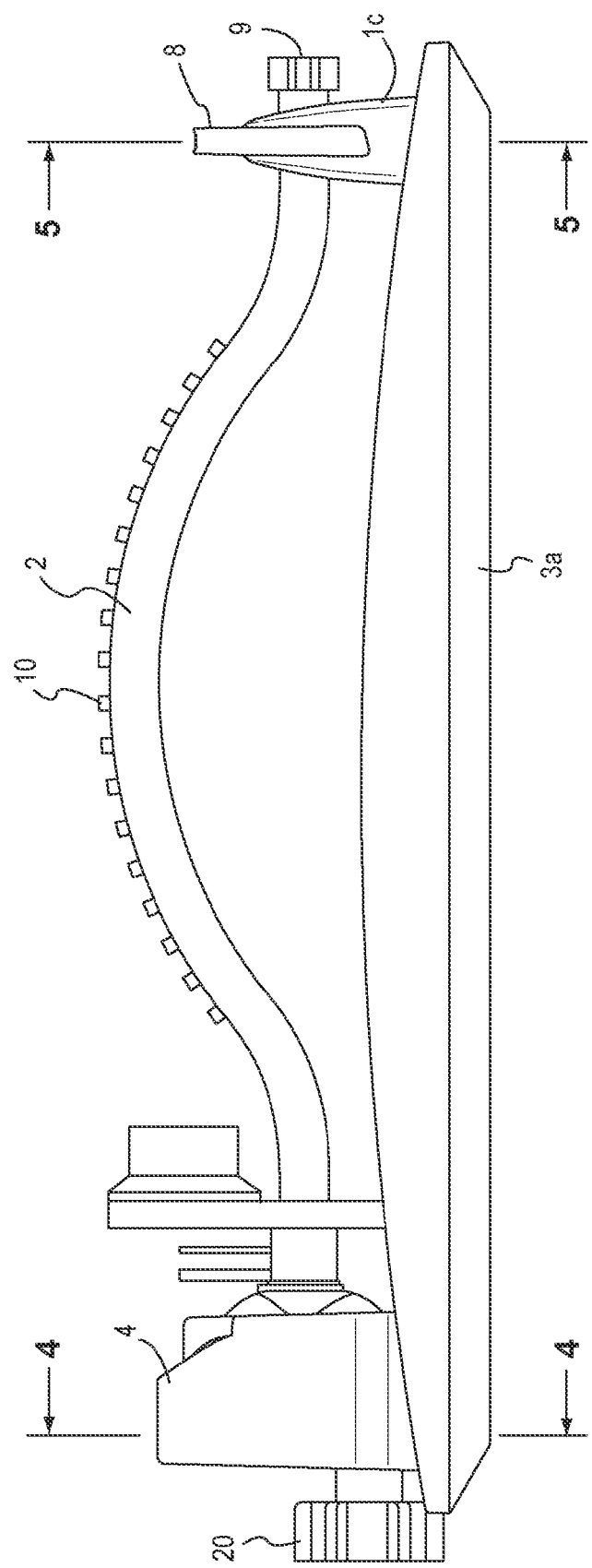
FIG. 3 is a side view of the first embodiment of the stackable sprinkler.

As can be seen in FIG. 3, the sled 3 has a flat bottom and can flatly rest on the ground.

Figure 4:
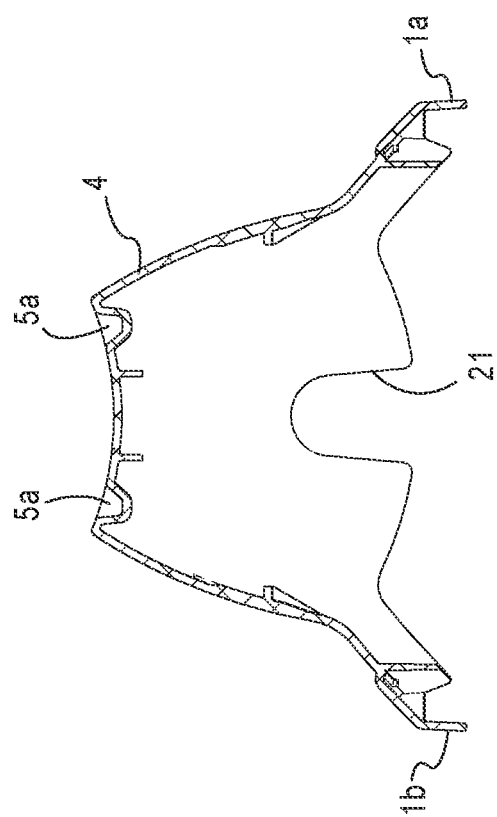
FIG. 4 is a cutaway view of a back end of the first embodiment of the stackable sprinkler.

FIG. 4 shows a cutaway view of the back of stackable sprinkler 1. As shown in FIG. 3, the cutaway view is looking from a center of the stackable sprinkler 1 to a rear of stackable sprinkler 1. Rear mortise 5a into which tenon 7a fit, is shown. Intake slot 21, through which intake 22 fits, is also shown.

Figure 5:
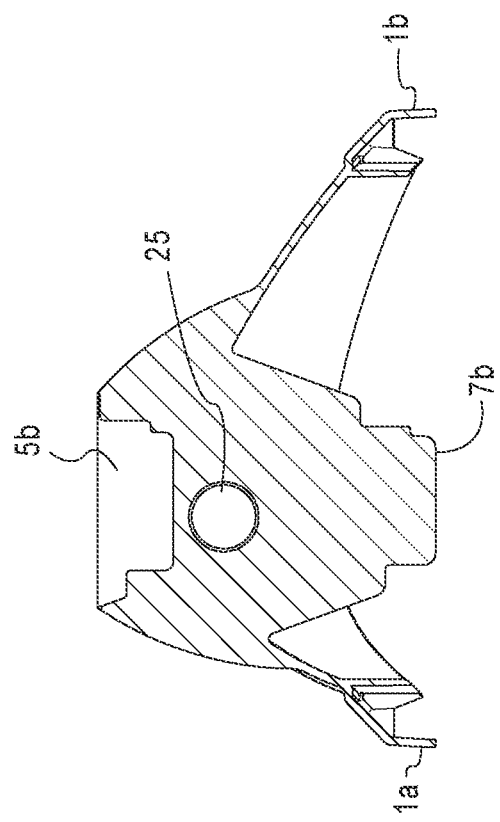
FIG. 5 is a cutaway view of a front end of the first embodiment of the stackable sprinkler.

FIG. 5 shows a cutaway view of the front of stackable sprinkler 1. As shown in FIG. 3, the cutaway view is looking from a center of the stackable sprinkler 1 to a front of stackable sprinkler 1. Front mortise 5b into which tenon 7b (of a second stackable sprinkler 1) fits, is shown.

As shown in the figure, the mortises and tenons 5b and 7b may have notches or indentations within them to help form a more secure joint. For example, front mortise 5b has a notch on its right and left sides. These notches are different heights and widths. This allows the tenon 7b, with corresponding notches, to fit within the mortise 5b in only 1 direction. This also helps to ensure a more secure joint between the mortise 5b and the tenon 7b.

A spray tube hole 25 is shown below mortise 5b.

Figure 6:
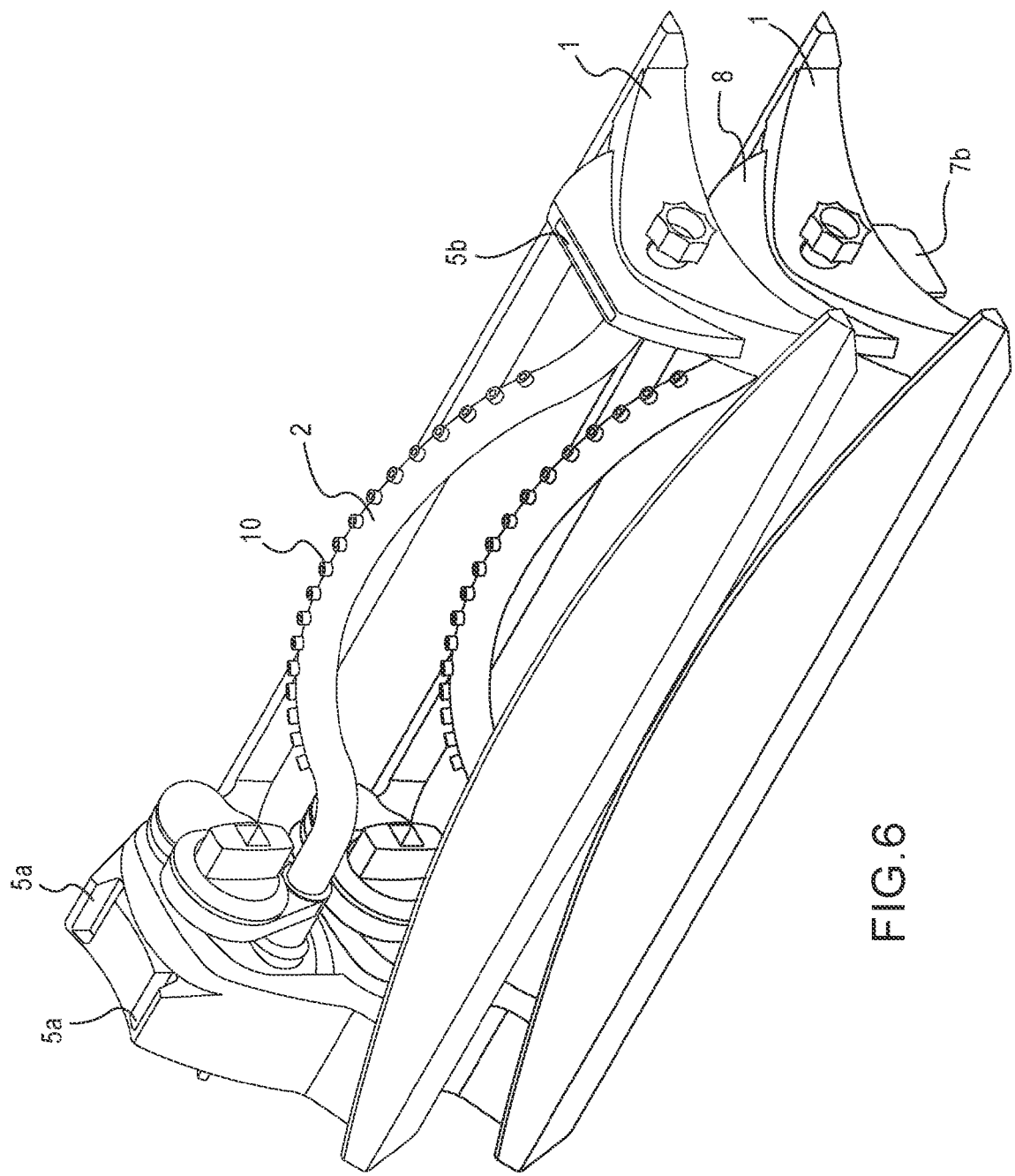
FIG. 6 is a top perspective view of the first embodiment of two stacked sprinklers.

FIG. 6 shows two stackable sprinklers of the first embodiment stacked together. The stackable sprinkler is designed so that the motor and spray tube do not interfere with the mortise and tenon joints. For example, front mortise receiving part 8 is tall enough so that spray tube 2 does not interfere with the stacking of the sprinklers or the front mortise and tenon joint 5b and 7b.

The stackable sprinklers are further designed so that they overlap and fit into one another, in the vertical direction. That is, as can be seen in FIG. 6, sprinklers 1 are designed to save space and be recessed in an adjacent sprinkler While a single stackable sprinkler 1 does not have any significant reduction in its form factor, when stacked, the form factor of two stackable sprinklers is less than the summed height of two stackable sprinklers standing alone.

Thus, the stackable sprinkler, when stacked with two or more other stackable sprinklers, is able to reduce its form factor by utilizing empty space in and around the adjacent stackable sprinklers.

This savings in space provides for a more efficient product in all aspects of manufacturing, shipping and selling the stackable sprinkler As stackable sprinklers can be made without boxes, this lowers the cost of manufacturing and results in a more environmentally friendly product. As more stackable sprinklers can fit into a shipping container or trailer, this saves shipping costs as fewer containers or trailers need to be used. Further, as more stackable sprinklers can be placed on a retail shelf, less time needs to be devoted to re-stocking the shelves. This saves retailers much needed shelf space and man hours.

In order to stack the sprinklers 1, a person simply aligns the mortise and tenon joints found on the top and bottom of respective sprinklers, and brings them together. The tenons 7b and 7a found in the front and back of the sled 3 respectively, will be held in place by the mortises 5b and 5a found in the front and back of the sled 3. The respective mortises and tenons will form 3 mortise and tenon joints which are releasably connected to one another.

Figure 7:
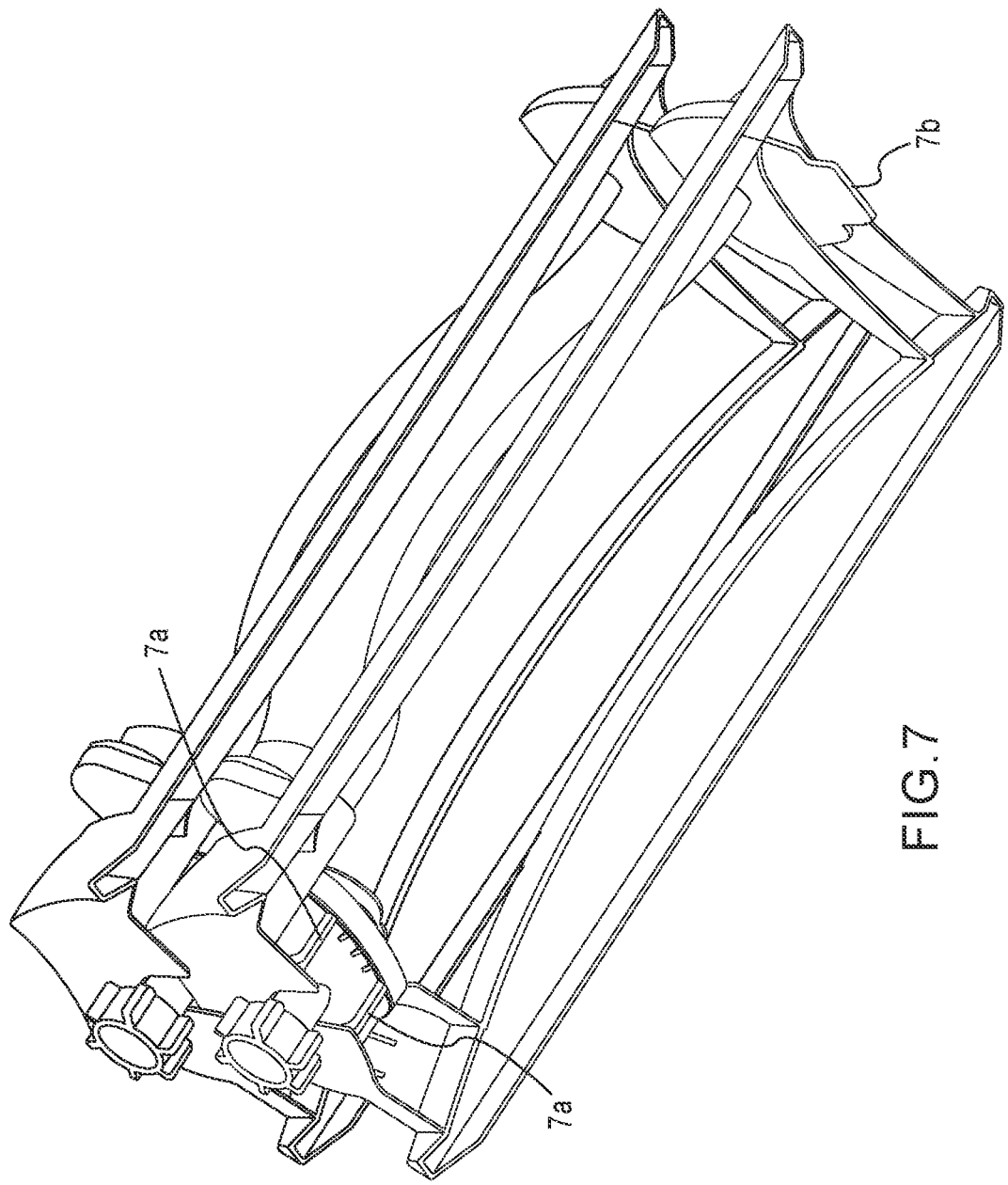
FIG. 7 is a bottom perspective view of the first embodiment of two stacked sprinklers.

FIG. 7 shows two stacked stackable sprinklers from below. Rear tenons 7a and front tenons 7b are shown.

Figure 8:
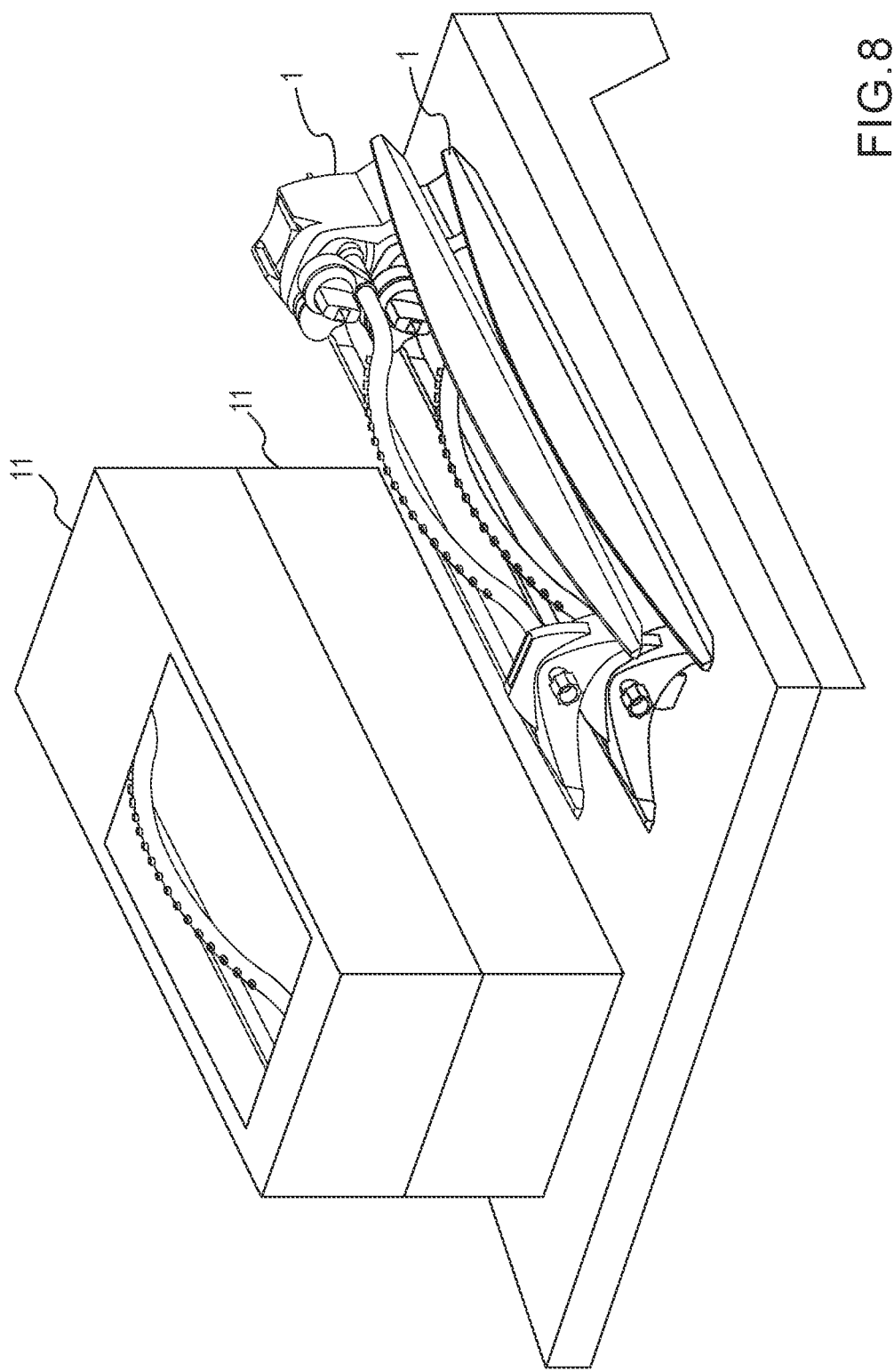
FIG. 8 is a view of the first embodiment alongside a boxed sprinkler.

FIG. 8 shows an example of how the stackable sprinkler 1 compares to a corresponding boxed sprinkler 11. In each of the three spatial dimensions, the stackable sprinkler 1 takes up less space than the boxed sprinkler 11. Two stackable sprinklers of the first embodiment show a 26% volumetric savings per unit, when compared to two equivalent boxed sprinklers 11. Examples of the specific dimensions are shown in Table 1.

TABLE 1

|  | Stackable Sprinkler 1 | Boxed Sprinkler 11 | Difference | % Change |
| --- | --- | --- | --- | --- |
| Height (in.) | 6.38 | 8 | 1.62 | 20.25% |
| Length (in.) | 17 | 17.5 | .5 | 2.9% |
| Width (in.) | 6.25 | 6.5 | .25 | 3.8% |

This savings in volume directly affects the quantity of products a retailer can place on their shelf, and as such, is very important to a retailer.

Although the embodiment discussed above has 3 mortises located on the top of the sprinkler and 3 tenons located on the bottom of the sprinkler, the invention is not limited to this specific configuration. Any arrangement of mortises and tenons on a top or bottom of the sprinkler that allow the sprinkler to be stacked, is within the scope of the invention.

Figure 9:
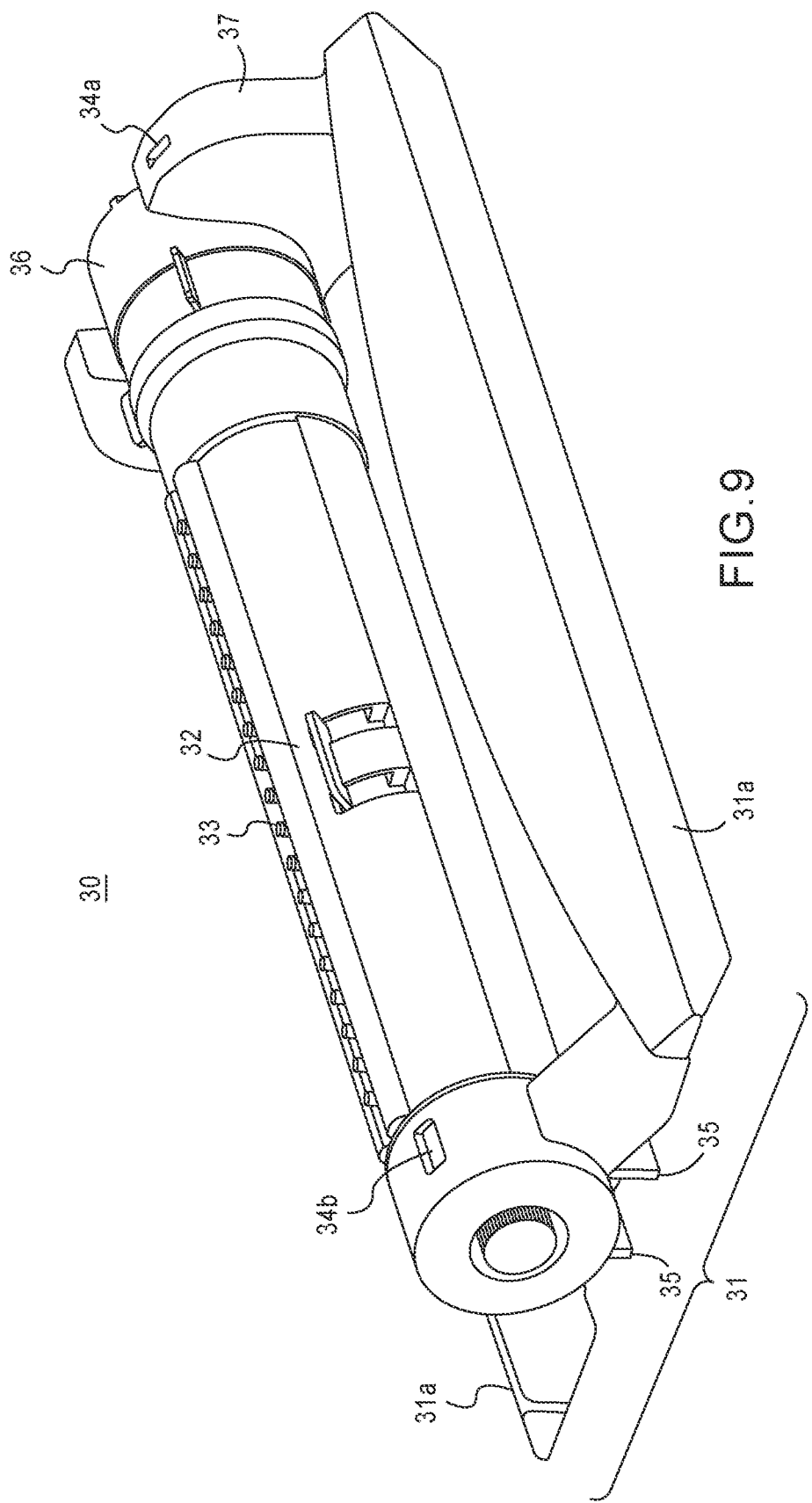
FIG. 9 is a top perspective view of a second embodiment of a stackable sprinkler.

FIG. 9 is a perspective view of a second embodiment. FIG. 9 could be an example of a Melnor® sprinkler, Model No. 4000/4100/4200™. As shown in the figure, a sled 31 is attached to spray tube 32. Spray tube 32 has nozzles 33 which release water to the desired area. A motor 36 drives the spray tube back and forth, allowing the water to cover a large area.

Mortise 34b (e.g., hole, channel, groove, etc.) is provided on the front, top end of the sled 31. Support column 37, attached to sled 31, is provided on the rear end of the sprinkler Rear mortise 34a is located in support column 37. Support column 37 allows a second stackable sprinkler to be stacked on top of the first stackable sprinkler without the base of the second stackable sprinkler contacting the spray tube of the first stackable sprinkler.

Legs 31a of sled 31 serve to stabilize the sprinkler 30 when it is placed on the ground, for example, when it is in use.

Figure 10:
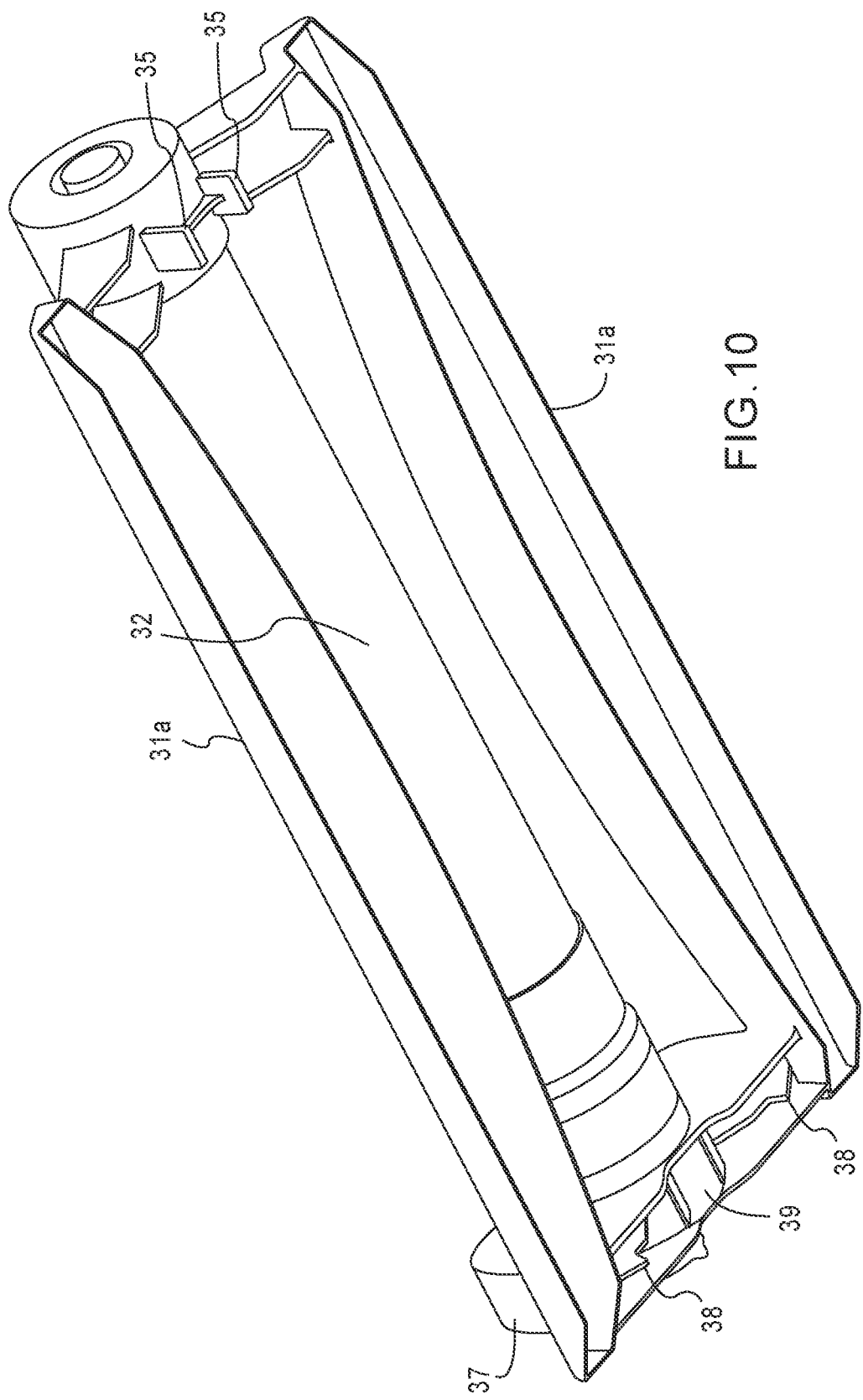
FIG. 10 is bottom perspective view of the second embodiment of the stackable sprinkler.

As best seen in FIG. 10, tenons 35 (e.g. pegs, protrusions, projection, etc.) are configured to insert into front mortises 34b. Located in the rear of sprinkler 30 and sled 31 is protruding portion 38 (e.g. pegs, protrusions, projection, etc.) and recessed portion 39. Protruding portion 38 is designed to be inserted into rear mortises 34a. Once inserted in rear mortises 34a, protruding portion 38 help to securely fasten two stackable sprinklers together.

As shown in FIG. 10, front mortises 34b are aligned with sled (longitudinal direction) and rear mortises 34a are aligned perpendicular to the direction of the sled. When a stackable sprinkler is stacked on another stackable sprinkler, the tenons fit within the mortises forming a mortise and tenon joint which is releasably connected. The protruding portions fit within the mortises also forming a releasable connected joint. Further, having one set of mortise and tenon joints aligned with the sled 3 and another set of joints aligned perpendicular to sled 31, allows the top stackable sprinkler to be securely fastened to the bottom stackable sprinkler That is, the top stackable sprinkler is prevented from moving in a forward or backwards direction by the rear mortise and rear protruding part and is prevented from moving in a sideways direction by the front mortise and tenon joints.

Recessed portion 39 is located at the rear end of the frame of sled 31. Recessed portion 31 allows the spray tube 32 of a second stackable sprinkler to fit securely under the first stackable sprinkler Without this added clearance, the protruding portions 38 would not be long enough to fit within the rear mortises 34a.

Figure 11:
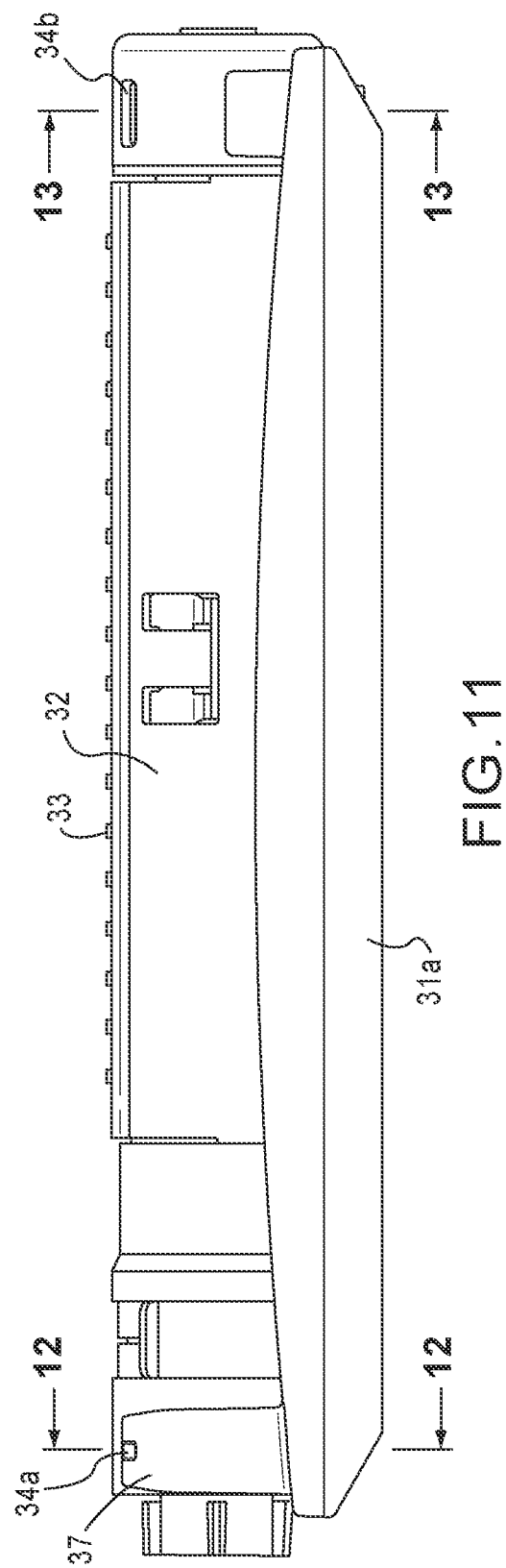
FIG. 11 is a side view of the second embodiment of the stackable sprinkler.

As can be seen in FIG. 11, the sled 31 has a flat bottom and can stably rest on the ground.

Figure 12:
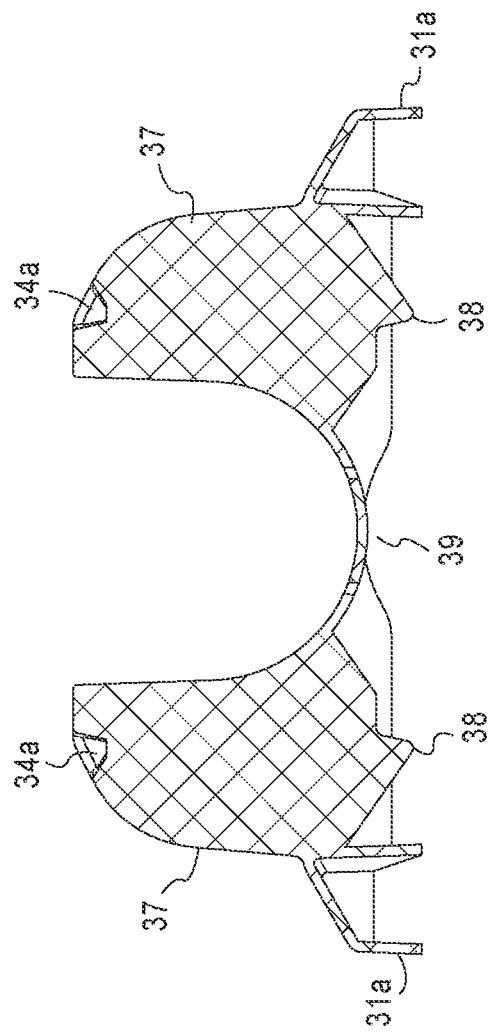
FIG. 12 is a cutaway view of a back end of the second embodiment of the stackable sprinkler.

FIG. 12 shows a cutaway view of the back of stackable sprinkler 30. As shown in FIG. 12, the cutaway view is viewed from a center of the stackable sprinkler 30 to a back of stackable sprinkler 30. Protruding portions 38 and recessed portion 39 can clearly be seen.

Support columns 37 are shown next to the cavity in which the spray tube 32 would be positioned. Located on the top of support columns 37 are rear mortises 34a. The shape of the rear mortises 34a are designed to securely fasten to protruding portions 38. That is, when the protruding portions 38 are inserted into the rear mortises 34a they form a releasably connected joint.

As seen by the shape of the protruding portions 38, they are configured to prevent the movement of the sprinkler in any lateral direction. That is, the protruding portions are angled inwards, and serve to lock the top sprinkler in place, with respect to any horizontal movement.

Figure 13:
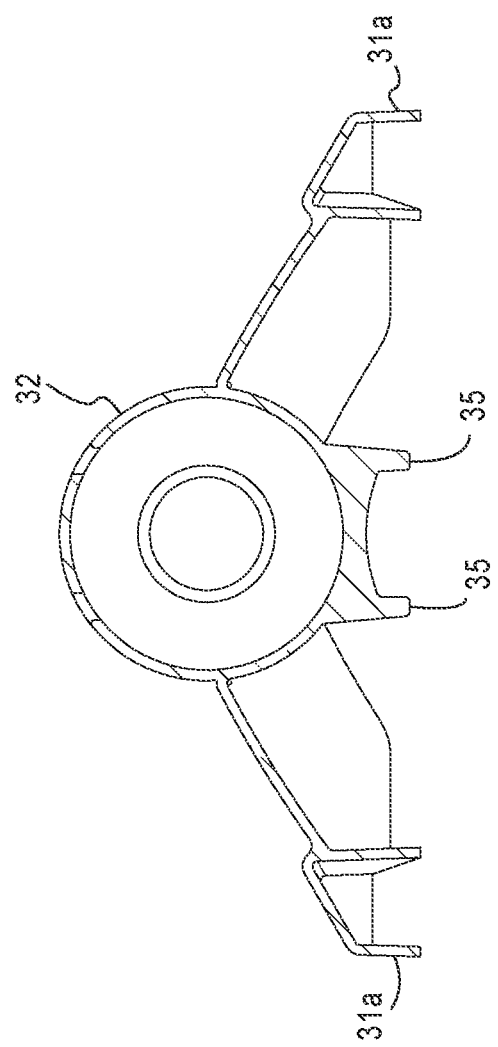
FIG. 13 is a cutaway view of a front end of the second embodiment of the stackable sprinkler.

Front tenons 35 are best seen in FIG. 13. The front tenons are configured to fit within front mortises 34b (not shown). As with the rear joint (i.e. rear mortises 34a and protruding portion 38), the front joint is designed to prevent any horizontal movement of the top sprinkler with respect to the bottom sprinkler.

Not shown in FIG. 13 are the front mortises 34b. These front mortises are recessed into the top/front part of sled 31.

Figure 14:
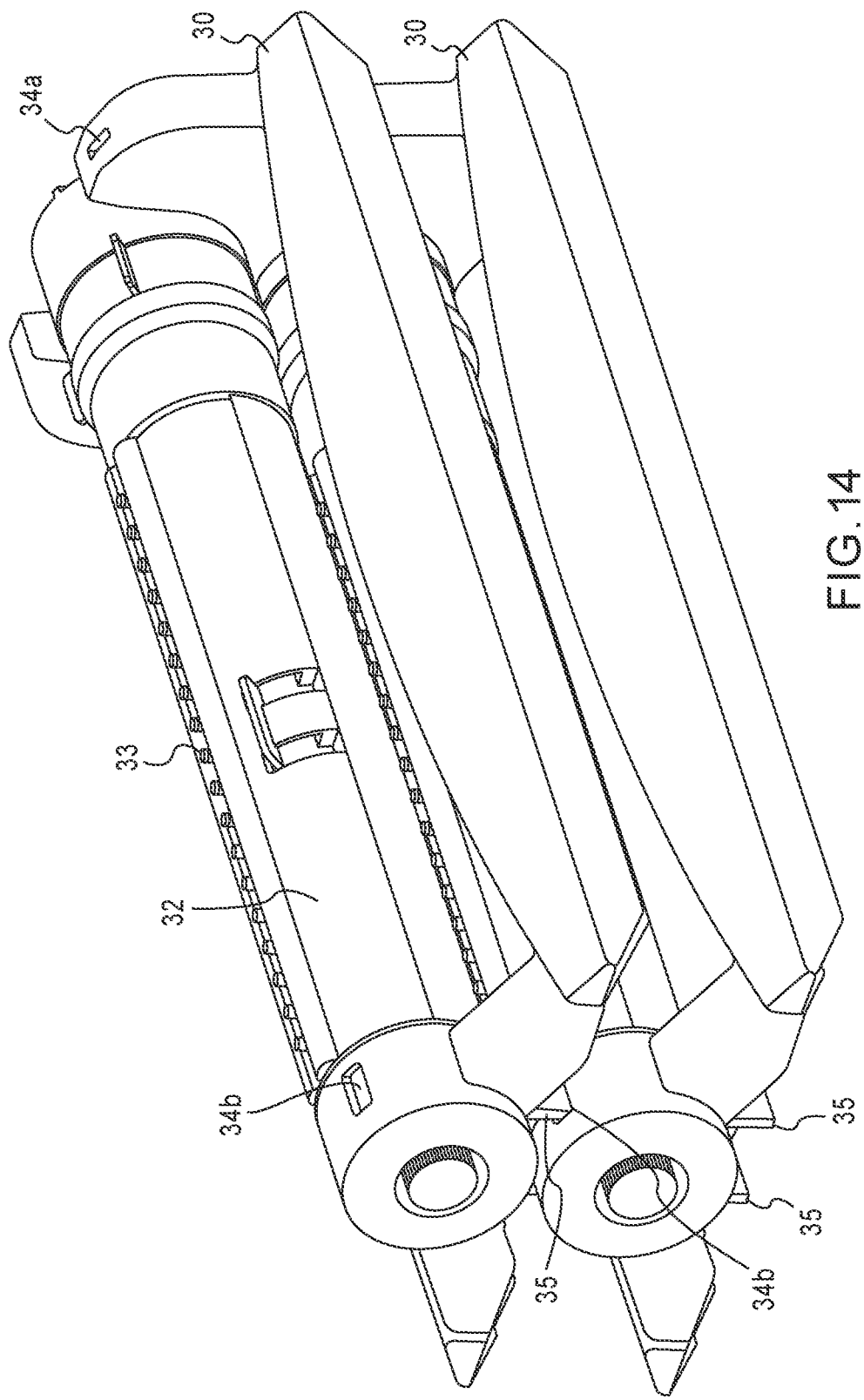
FIG. 14 is a top perspective view of the second embodiment of two stacked sprinklers.

FIG. 14 shows two stackable sprinklers of the second embodiment stacked together. The stackable sprinkler is designed to occupy a minimum space. That is, the sprinklers are designed so that they overlap and fit into one another, in the vertical direction.

As can be seen in FIG. 14, sprinklers 30 were designed to save space by being partly recessed in an adjacent sprinkler Thus, while a single stackable sprinkler 30 does not have any significant reduction in its form factor, when stacked, the form factor of two stackable sprinklers is less than the summed height of two stackable sprinklers standing alone.

Thus, the stackable sprinkler, when stacked with two or more other stackable sprinklers is able to reduce its form factor by utilizing empty in and around the adjacent stackable sprinklers.

This savings in space provides for a more efficient product in all aspects of manufacturing, shipping and selling the stackable sprinkler As stackable sprinklers can be made without boxes, this lowers the cost of manufacturing. As more stackable sprinklers can fit into a shipping container or trailer, this saves shipping costs as fewer containers or trailers need to be used. Further, as more stackable sprinklers can be placed on a retail shelf, less time needs to be devoted to re-stocking the shelves. This saves retailers much needed shelf space and man hours.

In order to stack the sprinklers 30, a person must simply align the respective sprinklers, and bring them together. The rear mortises 34a and protruding portions 38, are designed to fit within one another. The front tenons 35 and front mortises 34b are also designed to fit together. When the sprinklers are stacked, they form an overlapping unit.

If looking directly down at a pair of stacked sprinklers, only the top sprinkler would be visible.

Figure 15:
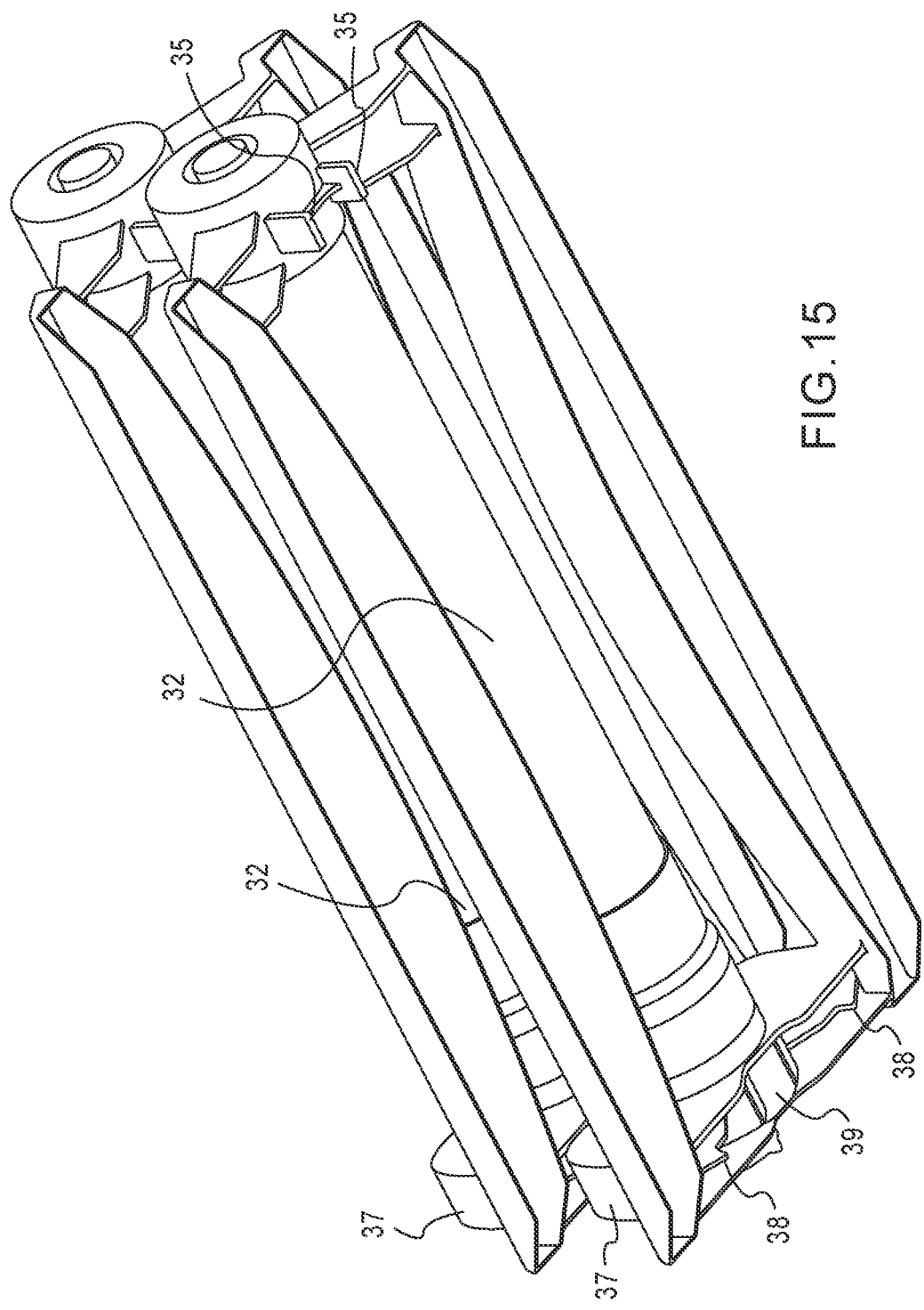
FIG. 15 is a bottom perspective view of the second embodiment of two stacked sprinklers.

FIG. 15 shows two stacked stackable sprinklers from below. Front tenons 35, protruding portions 38 and recessed portion 39 are clearly shown.

Figure 16:
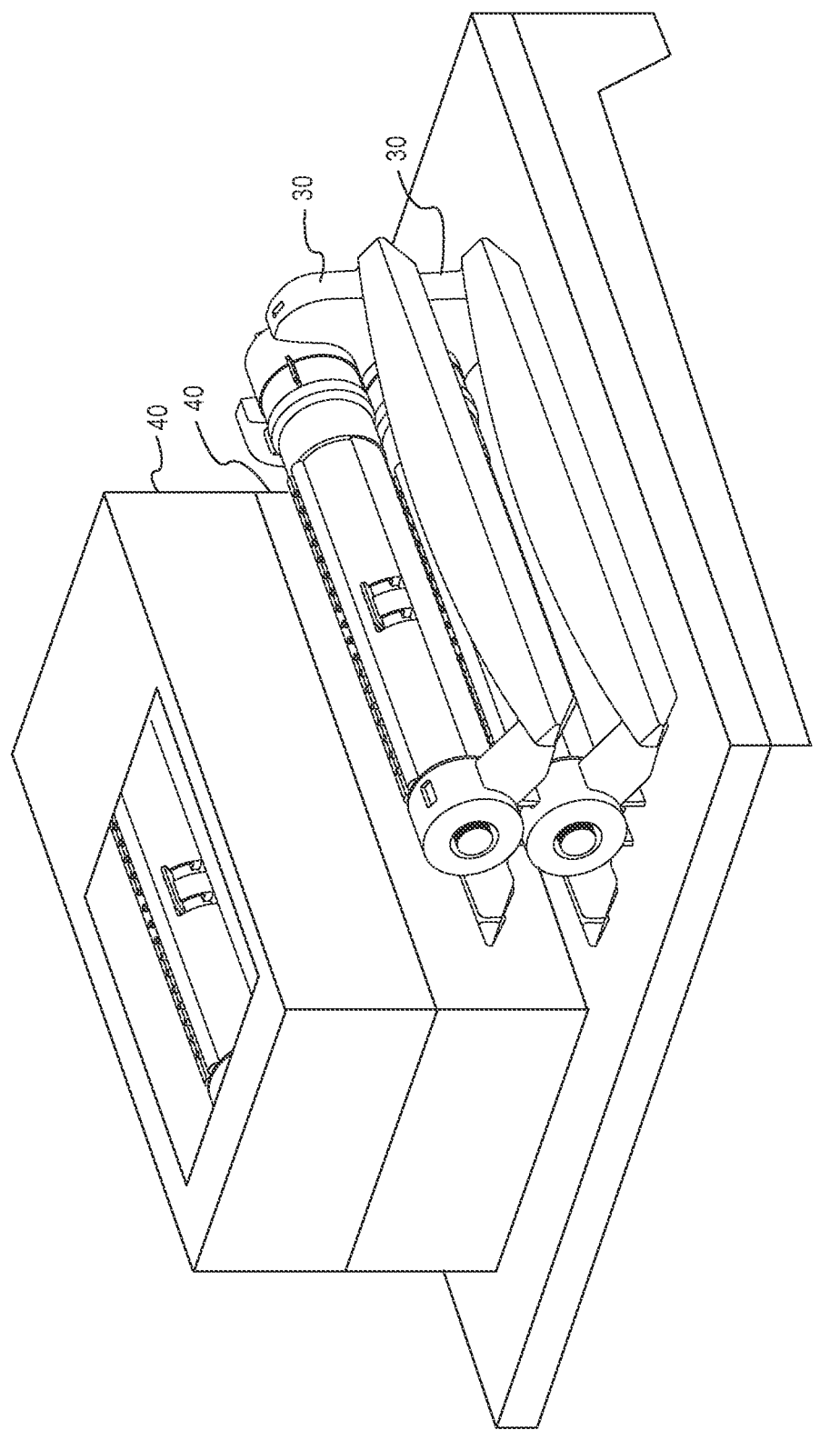
FIG. 16 is a view of the second embodiment alongside a boxed sprinkler.

FIG. 16 shows an example of how the stackable sprinkler 30 compares to a corresponding boxed sprinkler 40. In each of the three spatial dimensions, the stackable sprinkler 30 takes up less space than the boxed sprinkler 40. Two stackable sprinklers of the second embodiment show a 27% volumetric savings per unit, when compared to two equivalent boxed sprinklers 40. Examples of the specific dimensions are shown in Table 2.

TABLE 2

|  | Stackable Sprinkler 30 | Boxed Sprinkler 40 | Difference | % Change |
|---|---|---|---|---|
| Height (in.) | 5.38 | 7 | 1.62 | 23.1% |
| Length (in.) | 17.25 | 17.5 | .25 | 1.4% |
| Width (in.) | 6.75 | 7 | .25 | 3.6% |

Although the embodiment discussed above has 34 mortises located on the top of the sprinkler and 2 tenons and 2 protruding portions located on the bottom of the sprinkler, the invention is not limited to this specific configuration. Any arrangement of mortises and tenons/protruding portions on a top or bottom of the sprinkler that allow the sprinkler to be stacked, is within the scope of the invention.

Figure 17:
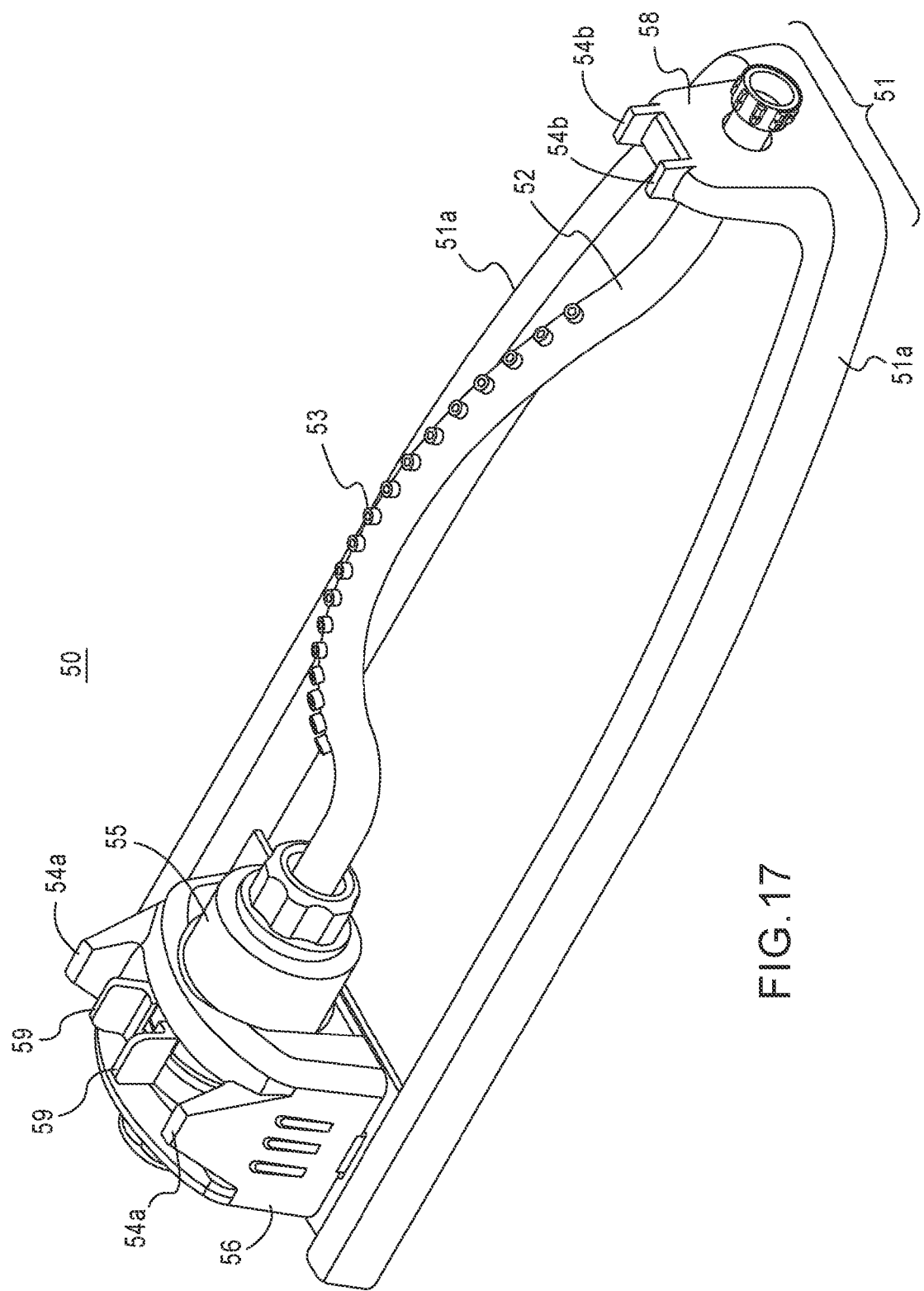
FIG. 17 is a top perspective view of a third embodiment of a stackable sprinkler.

FIG. 17 is a perspective view of a third embodiment. Sprinkler 50 could be, for example, Melnor® sprinkler, Model No. 70360M™. As shown in the figure, a sled 51 is attached to spray tube 52. Spray tube 52 has nozzles 53 which release water to the desired area. A water powered motor 55 drives the spray tube back and forth, allowing the water to cover a large area. Sled legs 51a, located on either side of the sled 51, provide support for sprinkler 50.

Located on the front end of the sled 51 is tenon 54b. Attached to sled 51 and located on the back end of the sprinkler is bracket 56. Bracket 56 is attached to sled 51 and may be made of metal, plastic or any other suitable material.

Located in the front of sled 51 is support column 58. Support column 58 includes a hole for the front of spray tube 52, as well as tenons 54b. Tenons 54b (e.g. pegs, protrusions, projection, etc.) are designed to fit within front receiving portions 60 (shown in FIG. 18).

Figure 18:
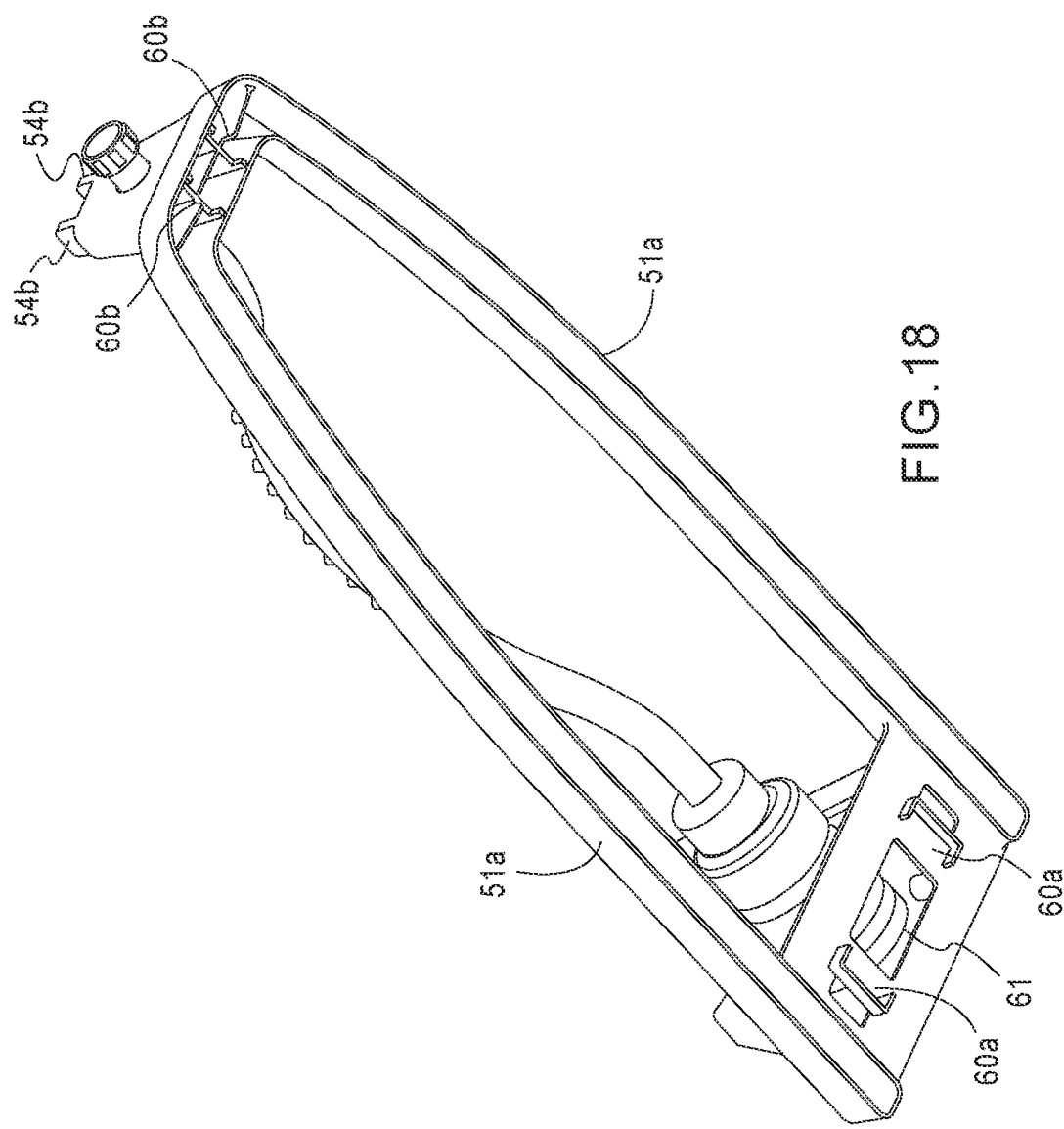
FIG. 18 is bottom perspective view of the third embodiment of the stackable sprinkler.

As best seen in FIG. 18, front and rear receiving portions, 60b and 60a respectively (e.g. holes, channels, grooves, etc.), are configured to receive front and rear tenons, 54b and 54a, respectively. That is, rear receiving portions 60a fits around three sides of rear tenons 54a. This ensures a stable, releasable joint, when the sprinkler 50 is stacked on another sprinkler.

Further, sled 51 includes a rear cavity, located in the rear of sprinkler 50. This rear cavity allows the adjustment tab 59 to fit within the cavity, when two sprinklers are stacked on top of one another. By having the adjustment tab fit within empty space in another sprinkler 50, this saves space when the sprinklers are stacked together.

Figure 19:
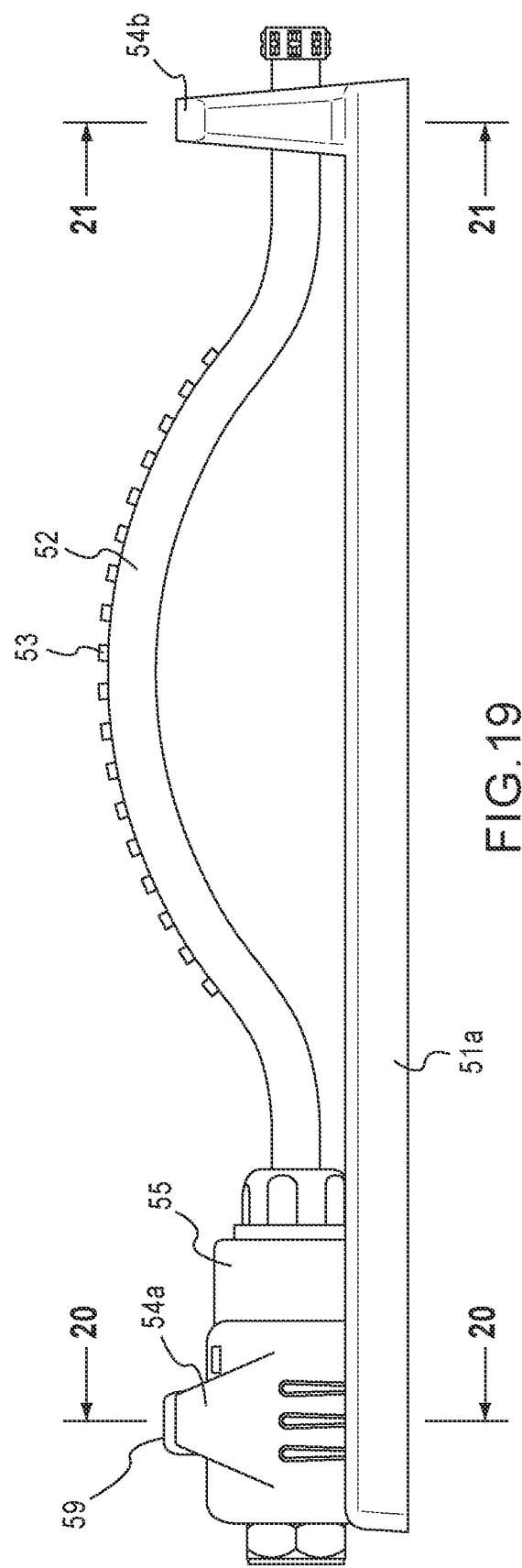
FIG. 19 is a side view of the third embodiment of the stackable sprinkler.

As can be seen in FIG. 19, the sled 51 has a flat bottom and can stably rest on the ground.

Figure 20:
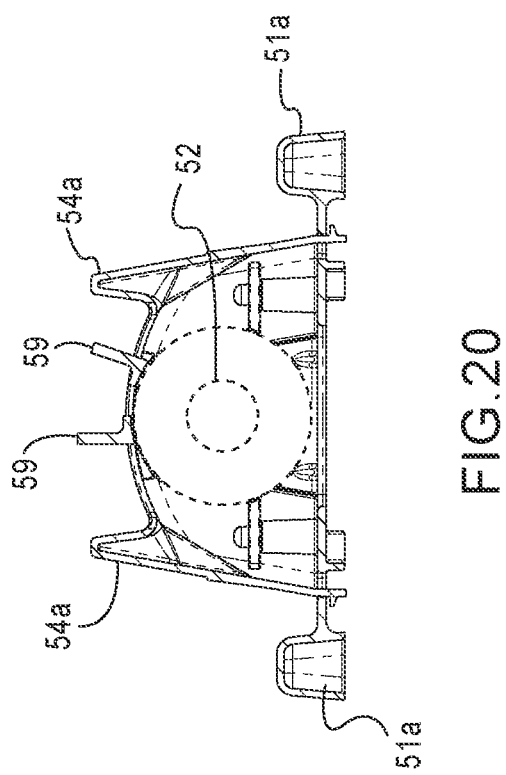
FIG. 20 is a cutaway view of the back end of a third embodiment of the stackable sprinkler.

FIG. 20 shows a cutaway view of the back of stackable sprinkler 50. As shown in FIG. 20, the cutaway view is looking from a center of the stackable sprinkler 50 to a back of stackable sprinkler 30. Adjustment tabs 59 are shown slightly higher than front tenons 54b. As indicated above, the adjustment tabs 59 can fit into rear cavity 61 (see FIG. 18), thus reducing the form factor of two sprinkler units stacked together.

Figure 21:
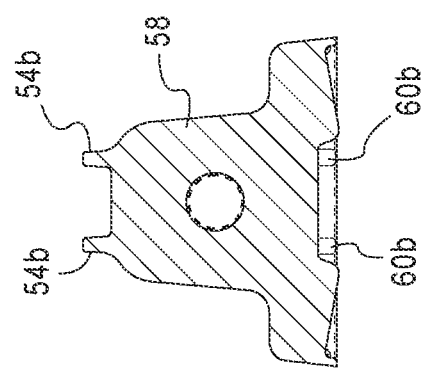
FIG. 21 is a cutaway view of the front end of a third embodiment of the stackable sprinkler.

Front tenons 54b are best seen in FIG. 21. These front tenons fit into front receiving portions 60b of another oscillating sprinkler.

Figure 22:
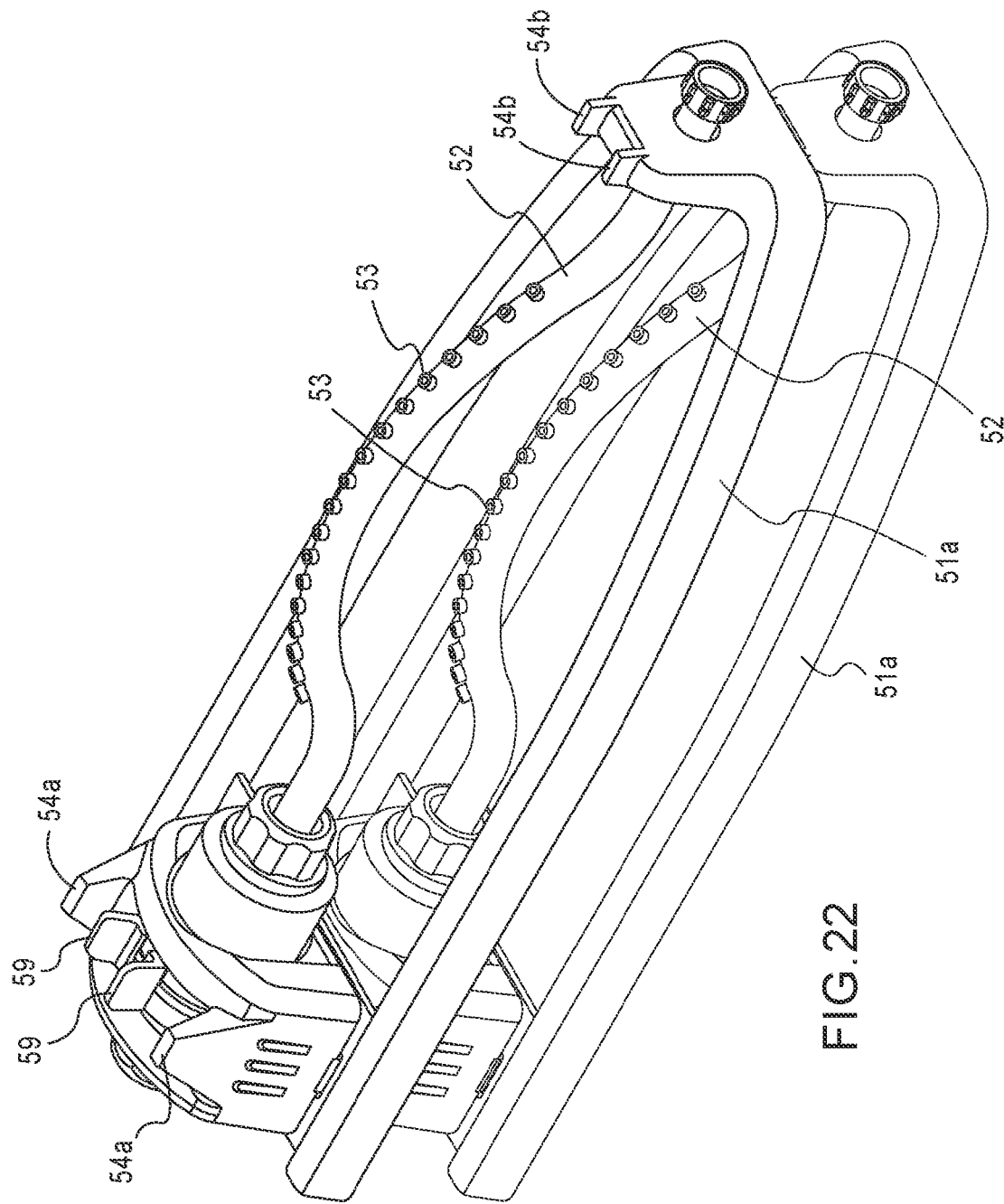
FIG. 22 is a top perspective view of the third embodiment of two stacked sprinklers.

FIG. 22 shows two stackable sprinklers of the third embodiment stacked together. The stackable sprinkler is designed to occupy a minimum space. That is, the sprinklers are designed so that they overlap and fit into one another, in the vertical direction.

As can be seen in FIG. 22, sprinklers 50 were designed to save space and be recessed in an adjacent sprinkler Thus, while a single stackable sprinkler 50 does not have any significant reduction in its form factor, when stacked, the form factor of two stackable sprinklers is less than the summed height of two stackable sprinklers standing alone.

Thus, the stackable sprinkler, when stacked with two or more other stackable sprinklers is able to reduce its form factor by utilizing empty in and around the adjacent stackable sprinklers.

This savings in space provides for a more efficient product in all aspects of manufacturing, shipping and selling the stackable sprinkler As stackable sprinklers can be made without boxes, this lowers the cost of manufacturing. As more stackable sprinklers can fit into a shipping container or trailer, this saves shipping costs as fewer containers or trailers need to be used. Further, as more stackable sprinklers can be placed on a retail shelf, less time needs to be devoted to re-stocking the shelves. This saves retailers much needed shelf space and man hours.

In order to stack the sprinklers 50, a person must simply align the respective sprinklers, and bring them together. The rear receiving portions 60a and rear tenons 54a are designed to fit within one another. The front tenons 54b and front receiving portions 60b are also designed to fit together. When the sprinklers are stacked, they form a level and completing overlapping unit.

That is, if looking directly down at a pair of stacked sprinklers, only the top sprinkler would be visible.

Figure 23:
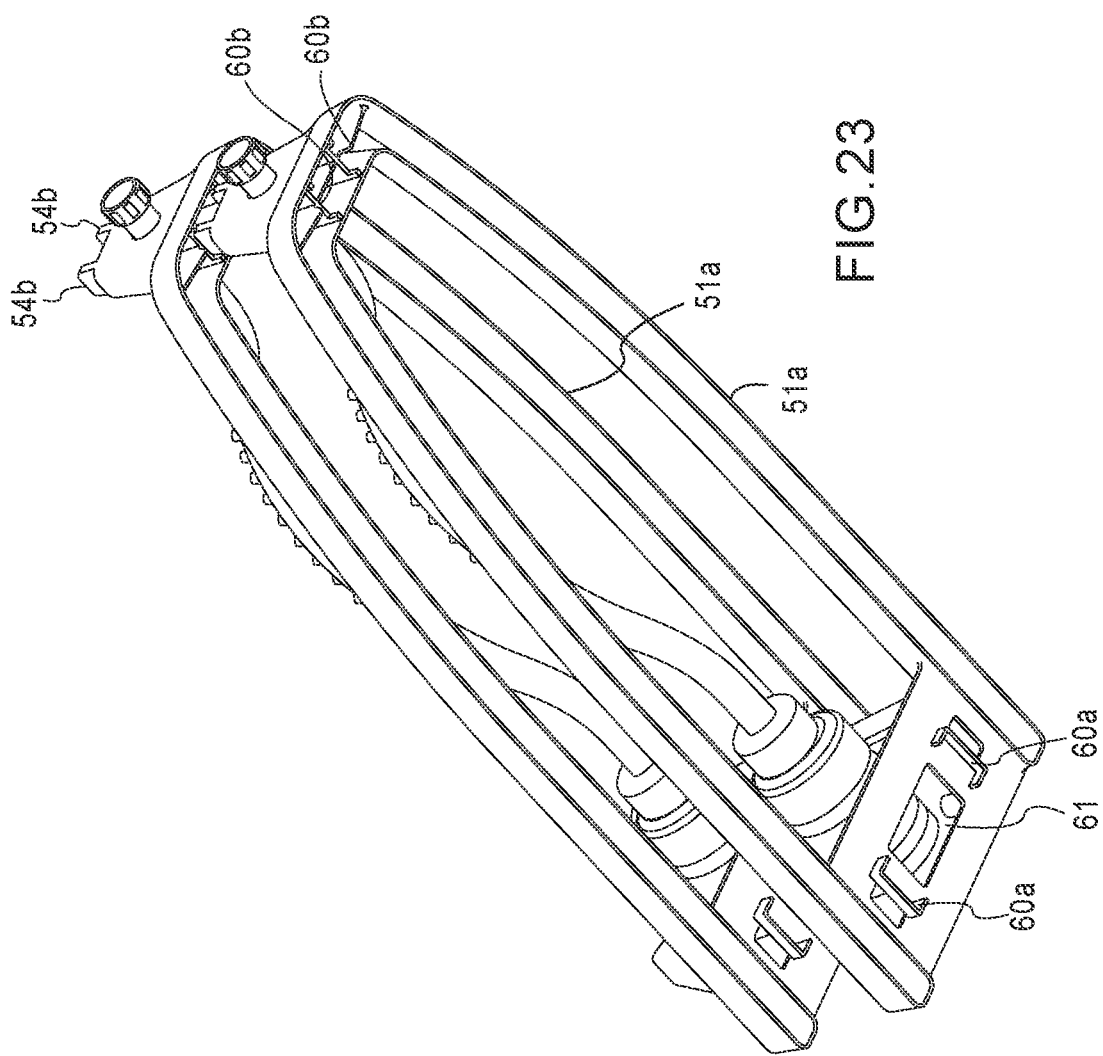
FIG. 23 is a bottom perspective view of the third embodiment of two stacked sprinklers.

FIG. 23 shows two stacked stackable sprinklers from below. Front receiving portions 60b, rear receiving portions 60a and rear cavity 61 are clearly shown.

Figure 24:
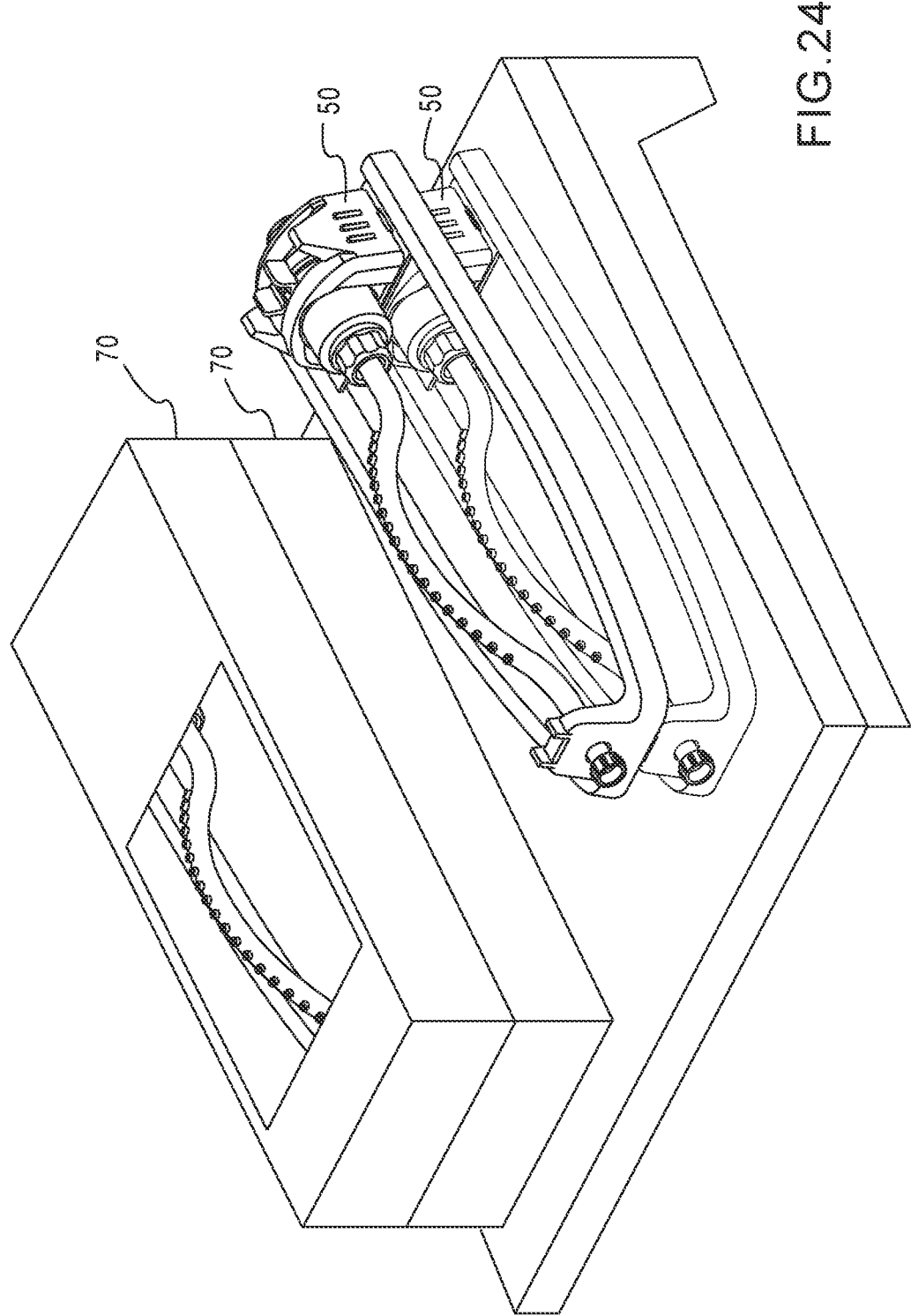
FIG. 24 is a view of the third embodiment alongside a boxed sprinkler.

FIG. 24 shows an example of how the stackable sprinkler 50 compares to a corresponding boxed sprinkler 70. In each of the three special dimensions, the stackable sprinkler 50 takes up less space than the boxed sprinkler 70. Two stackable sprinklers of the first embodiment show a 12.4% volumetric savings per unit, when compared to two equivalent boxed sprinklers 70. Examples of the specific dimensions are shown in Table 3.

TABLE 3

|  | Stackable Sprinkler 50 | Boxed Sprinkler 70 | Difference | % Change |
| --- | --- | --- | --- | --- |
| Height (in.) | 5.5 | 6 | .5 | 8.3% |
| Length (in.) | 18.5 | 18.63 | .13 | .7% |
| Width (in.) | 6.25 | 6.5 | .25 | 3.8% |

Although the embodiment discussed above has 4 tenons located on the top of the sprinkler and 4 receiving portions located on the bottom of the sprinkler, the invention is not limited to this specific configuration. Any arrangement of mortises/receiving portions and tenons on a top or bottom of the sprinkler that allow the sprinkler to be stacked, is within the scope of the invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

The Invention claimed is:

1. A sprinkler adapted to be stacked upon a like sprinkler, comprising:
    a spray tube;
    a sled;
    a plurality projections extending from either a top or bottom surface of the sled; and
    a plurality of recesses formed in the top or bottom surface of the sled, wherein
    the plurality of recesses are configured to securely accommodate the plurality of projections extending from the sled of said like sprinkler so that said sprinkler can be stacked with said like sprinkler,
    the plurality of recesses comprises two recesses formed at a first end of the top surface of the sled and one recess formed at a second end of the top surface of the sled, and
    the two recesses are rectangular-shaped and aligned in a lengthwise direction of the sled and the one recess is rectangular-shaped and aligned perpendicular to the sled direction.

2. The sprinkler of claim 1, wherein said plurality of projections comprises three projections extending from the bottom surface of the sled.

3. The sprinkler of claim 2, wherein said sled has plurality of projections comprises two projections extending from a first end of the bottom surface of the sled and one projection extending from a second end of the bottom surface of the sled.

4. The sprinkler of claim 3, wherein the two projections are aligned in a lengthwise direction of the sled and the one projection is aligned perpendicular to the sled direction.

5. The sprinkler of claim 1, further comprising:
a water intake tube designed to pass water from a hose to the sprinkler; and
a cutaway formed in the sled haing a similar shape as the water intake tube, wherein
the cutaway accommodates the water intake tube of said like sprinkler.

6. A sprinkler adapted to be stacked upon a like sprinkler, comprising:
a spray tube;
a sled;
a projection extending from either a top or bottom surface of the sled;
a recess formed in the top or bottom surface of the sled, said recess configured to securely accommodate the projection extending from the sled of said like sprinkler so that said sprinkler can be stacked with said like sprinkler;
a protrusion extending from a surface of the projection; and
a notch formed in a surface of the recess, wherein
the notch has a similar shape as the protrusion, and
the notch is designed to accommodate the protrusion of said like sprinkler.

7. The, sprinkler of claim 1, wherein a plurality of projections extends from a top surface of the sled and a plurality of recesses is formed in a bottom surface of the sled.

8. The sprinkler of claim 7, wherein two projections and two recesses are arranged on a first end of the sled and two projections and two recesses are arranged on a second end of the sled.

9. The sprinkler of claim 1, further comprising:
an adjustment tab extending from the top surface of the sled, for adjusting a desired width of water spray, and
a rear cavity located in the bottom surface of the sled, wherein
the rear cavity is designed to accommodate the adjustment tab of said like sprinkler.

10. A method of stacking a first sprinkler on a second sprinkler, wherein
said first and second sprinklers comprise a structure as recited in claim 1,
the plurality of recesses of said first sprinkler is designed to securely accommodate the plurality of projections of said second sprinkler so that said first sprinkler can be stacked with said second sprinkler, wherein said method comprises:
placing said first sprinkler on top of said second sprinkler such that said plurality of recesses and said plurality of projections on the top and bottom of said first and second sprinklers align and securely engage within one another.

11. The sprinkler of claim 6, further comprising:
a water intake tube designed to pass water from a hose to the sprinkler; and
a cutaway formed in the sled haing a similar shape as the water intake tube, wherein
the cutaway accommodates the water intake tube of said like sprinkler.

12. The sprinkler of claim 6, further comprising:
an adjustment tab extending from the top surface of the sled for adjusting a desired width of water spray, and
a rear cavity located in the bottom surface of the sled, wherein
the rear cavity is designed to accommodate the adjustment tab of said like sprinkler.

13. The sprinkler of claim 6, wherein said projection comprises a plurality of projections extending from a top surface of the sled and said recess comprises a plurality of recesses formed in a bottom surface of the sled.

14. The sprinkler of claim 13, wherein said plurality of projections and plurality of recesses comprise two projections and two, recesses arranged on a first end of the sled and two projections and two recesses are arranged on a second end of the sled.

* * * * *